United States Patent [19]
Ruiz

[11] Patent Number: 5,734,524
[45] Date of Patent: Mar. 31, 1998

[54] HEAD SUSPENSION ASSEMBLY SUPPORTED BY AN AIR BEARING SURFACE

[75] Inventor: Oscar J. Ruiz, San Jose, Calif.

[73] Assignee: International Business Machines Corporation, Armonk, N.Y.

[21] Appl. No.: 748,681

[22] Filed: Nov. 13, 1996

[51] Int. Cl.$^6$ .............................. G11B 5/60; G11B 21/21
[52] U.S. Cl. ................................... 360/104; 360/103
[58] Field of Search ......................... 360/104, 103

[56] References Cited

U.S. PATENT DOCUMENTS

| | | | |
|---|---|---|---|
| 4,670,804 | 6/1987 | Kant et al. | 360/102 |
| 4,819,094 | 4/1989 | Oberg | 360/104 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,140,482 | 8/1992 | Kimura et al. | 360/104 |
| 5,335,126 | 8/1994 | Tokuyama et al. | 360/103 |

FOREIGN PATENT DOCUMENTS

| | | |
|---|---|---|
| 3541021 A1 | 11/1985 | Germany . |
| 54-54614 | 5/1979 | Japan . |
| 4-301210 | 10/1993 | Japan . |

*Primary Examiner*—Robert S. Tupper
*Attorney, Agent, or Firm*—Donald J. Pagel; Hopkins & Carley

[57] ABSTRACT

A suspension for use in a magnetic disk drive comprised of a flexible load beam and a slider. The flexible load beam is comprised of a two-layer laminate and air bearing structure is formed in one of the layers. Part of the flexible load beam rests on a data storage disk when the disk is not rotating. When the disk begins rotating, the air bearing structure causes the load beam to fly above the surface of the disk at a first flying height. Similarly, when the disk begins rotating, the air bearing surface of the slider causes the slider to fly above the surface of the disk at a second flying height. Typically, the first flying height is about ten times greater than the second flying height.

24 Claims, 5 Drawing Sheets

HEAD SUSPENSION ASSEMBLY SUPPORTED BY AN AIR BEARING SURFACE

TECHNICAL FIELD

The present invention relates to a suspension for use in a magnetic disk drive and more particularly to a flexible suspension having an air bearing surface incorporated into the suspension which causes the suspension to fly above the magnetic disk when the disk is rotating.

BACKGROUND ART

In attempting to make small high performance magnetic disk drives, several design issues must be addressed. A high performance drive is characterized by its high capacity (10 GB), high volumetric density (meaning a track density greater than 6,000-8,000 tracks per inch, a bit density greater than 200,000 bits per inch, and a disk spacing less than 1.5-2 mm), high data rate (rotational velocity greater than 10,000 rpm), high actuator access speed (low access time) and high reliability. A high volumetric density also implies a small size of the drive.

Some important issues that must be addressed in the design of such a file are the dynamics of the drive, the size of the different components and the height of the slider. The dynamics of the file are related to the vibration of the mechanical components during normal operation and during exceptional events like head slap and crash stop. Normal vibration makes the disks vibrate away from their nominal configuration. This vibration is both a displacement (away from the plane of the disks) and a rotation about certain characteristic radii of the disks.

This displacement and rotation couple with the flying slider mounted on a conventional suspension and make the magnetic element move back and forth away from the desired track the slider was supposed to be following. This excursion is proportional to the amount of disk vibration and to the distance between the disk surface and the slider dimple, i.e., the slider pivots about the suspension dimple. By reducing this distance, the excursion can be reduced. The vibration of the suspension itself, particularly the so-called torsion and sway modes, add to the unwanted excursions. These excursions limit the distance between magnetic tracks, and thus limit the track density and the capacity of the file. The rotational velocity (rpm) of the disk causes the vibration excitation to increase in a quadratic relation to the disk velocity.

The capacity and size of the drive is also limited by the number of disks in it and more specifically, by the spacing between them. The main determinant of such a spacing is the size of the suspension. Using a 50% slider, popular in most high performance files now, and having a thickness of 0.425 mm, a disk spacing of less than 1.8 mm cannot be realized. A larger disk spacing is needed to accommodate a pair of opposing suspensions after assembly is completed, to allow the insertion of the two suspensions between the disks during assembly, and to allow for all related dimensional tolerances. Therefore, reducing the size of the suspension is difficult with present technology.

Another factor that currently limits the development of small, high performance disk drives is data rate. Data rate is the velocity with which information is retrieved from the disk or stored on it. It is proportional to the bit density and the rotational velocity (rpm) of the disk. In drives of the prior art, the disk velocity is intentionally kept low to reduce the vibration caused by the turbulent air flow and the rotation of the disk bearings.

Another limiting factor in the development of small, high performance disk drives is access time. Access time is limited by the power of the actuator coil and the mass and inertia of the actuator. An important component of the actuator mass and inertia are the contributions made by the suspension and the slider. A thick and strong suspension promotes good dynamics and stability. However, these features also cause slow access time and heavy damage during slider slap. Therefore, prior art disk drive designs usually employ a compromise between these factors that prevents very small drives from being developed.

Slider slap is the violent contact of the slider and disk after the slider detaches from the disk during severe shock events. In this case, the acceleration imparted to the suspension/slider in the direction opposite of the disk defeats the preload that tends to keep slider on disk. Thus, the slider separates from the disk, but the preload forces the slider to return to the disk, slapping it at great velocity. Damage to the disk surface ensues with accompanying data loss. The damage is proportional to the suspension mass and the slider mass.

The requirement of high volumetric density implies that the flying height of the slider must be low so as to accommodate a high track and bit density. Common flying heights are on the order of 50 nm or less. To realize this height the disk surface roughness has to be smaller. Thus, a high recording density demands a very smooth disk. However, very smooth disks tend to allow high stiction forces. Stiction is the tendency of flat surfaces—like the slider and disk—to remain stuck together, as if joined with adhesive. The situation is aggravated by the slider preload and the use of lubricants to inhibit wear between the disk and slider. A suspension design that would pull the slider off the disk instead of plowing it into the disk, as with conventional designs during start operations, would reduce the problem of stiction.

Finally, a variety of other considerations are important in designing small, high performance disk drives. The cost of the drive must be reasonable, the reliability of the drive must be high and the drive must have the flexibility to be enhanced or adapted to various configurations.

SUMMARY OF THE PRESENT INVENTION

The present invention comprises a suspension for use in a magnetic disk drive comprising a flexible elongated section having a first end, a second end and a length "h" measured between the first end and the second end. The elongated section has a thickness "t" and includes a first layer comprised of a dielectric material and a second layer comprised of an electrically conductive material. The thickness "t" is small enough that the elongated section has flexibility similar to that of a sheet of writing paper. Typically, the thickness "t" is approximately 0.035 mm A first air-bearing feature is positioned in the elongated section and comprises a first channel formed in the second layer which has a depth "d" which is less than the thickness "b" of the second layer. The first channel is abutted along at least one side in the longitudinal direction by a portion of the second layer having the thickness "b." A second air-bearing feature is positioned in the elongated section and comprises a second channel formed in the second layer and which also has the depth "d." The second channel is abutted along at least one side in the longitudinal direction by a portion of the second layer having the thickness "b."

A slider for supporting a magnetic read/write transducer is positioned at an end of the elongated section, and the slider comprises an air bearing means for causing the slider to fly above the surface of the magnetic medium when the medium is rotating. Generally, the first and second air bearing features cause the elongated section to fly at a height of about 500 nm or less above the surface of the magnetic medium. The air bearing means on the slider causes the slider to fly at a height of approximately 60 nm or less above the surface of the magnetic medium.

The design of the present invention provides a suspension which uses a conventional type of slider and which is inexpensive to manufacture. The suspension has good dynamics because the stiff air bearing generated by the air bearing features in the flexible elongated section combine with the structural stiffness of the suspension to yield torsional and bending modes of about 10 kHz. The suspension has low mass and inertia because of the materials and thicknesses that are used. Very low disk spacing is needed and the static attitude and its effects are low because the air bearing surface on the slider is flush with the surface of the elongated section that faces the disk. The suspension design also allows high track density because off-track excursion is reduced. Finally, the problem of stiction is reduced because the air bearing features in the elongated section cause the suspension to peel away from the disk rather than to dive into it when the disk begins rotating. This allows the flying height of the slider to be reduced when flying on smooth disks.

DETAILED DESCRIPTION OF THE PREFERRED EMBODIMENT

Figure 1:
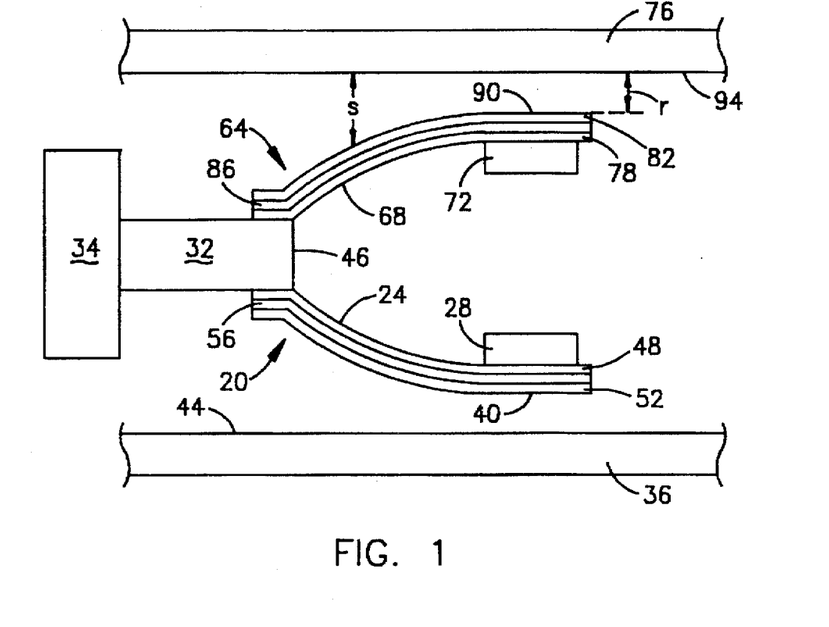
FIG. 1 is a side view of a pair of suspensions according to the present invention.

FIG. 1 illustrates a first suspension system 20 comprised of a load beam 24 and a slider 28. The load beam 24 is attached to a rigid arm 32 which is mechanically connected to an actuator 34. In the preferred embodiment, the slider 28 is a magnetic read/write slider with a magnetoresistive transducer. In the preferred embodiment, a 50% slider having the dimensions of 2×1.6×0.425 mm is used. Other types of transducers and sizes of sliders can also be used.

The transducer is formed on the slider 28 and is used to read and/or write data on a data storage medium, such as a hard magnetic disk 36, which is positioned adjacent to an air bearing surface 40 of the slider 28. The air bearing surface 40 faces a surface 44 of the disk 36. The arm 32 terminates in an end 46. Notice that the air bearing surface 40 is flush with the portion of the load beam 24 that faces the surface 44, as is shown more clearly in FIG. 4.

The load beam 24 is formed from a two-layer laminate. A first layer 48 comprises a dielectric material such as a polyimide. A second layer 52 comprises a high strength conductive material such as a high strength copper alloy. An example of such an alloy is the copper-nickel-silicon-magnesium alloy known as C7025 (full hard heat temper) manufactured by Olin Brass (composition 96.2% Cu; 3% Ni; 0.65% Si; and 0.15% Mg). Other suitable alloys include a high strength beryllium copper alloy (composition: 97.2–98.4% Cu; 0.2–0.6% Be; and 1.4–2.2% Ni, such as Brush Wellman beryllium copper alloy 3 (C17510) with an HT temper);. a high strength brass alloy (composition: 97.5% Cu; 2.35% Fe; 0.03% P; and 0.12% Zn, such as Olin Brass copper alloy C194 with an ex. spring temper); and a high strength titanium copper alloy (composition: 96.1–96.6% Cu; and 2.9–3.4% Ti, such as Nippon Mining titanium copper alloy with a TiCuR1-EHM temper). The invention is not limited to use with these materials. In the preferred embodiment, the laminate also includes an adhesive layer 56 which secures the first layer 48 to the second layer 52 and which is positioned between the first layer 48 and the second layer 52. In alternative embodiments, the load beam 24 may include a layer of thinly plated or sputtered carbon overcoat positioned over the second layer 52 (on the disk side) to reduce wear. Additionally, in other embodiments, the relative positions of the layers 48 and 52 may be reversed so that the first layer 48 faces the surface 44 of the disk 36.

A second suspension system 64 comprised of a load beam 68 and a slider 72 is attached to the arm 32 and positioned adjacent to a magnetic disk 76. The second suspension system 64 is identical the first suspension system 20 and the load beam 68 is formed from a two-layer laminate. A first layer 78 comprises a dielectric material such as a polyimide. A second layer 82 comprises a high strength conductive material such as the materials discussed previously with respect to the layer 52. In the preferred embodiment, the laminate also includes an adhesive layer 86 which secures the first layer 78 to the second layer 82 and which is positioned between the first layer 78 and the second layer 82. The slider 72 is used to read and/or write data on the magnetic disk 76 which is positioned adjacent to an air bearing surface 90 of the slider 72. The air bearing surface 90 faces a surface 94 of the disk 76.

In FIG. 1, the systems 20 and 64 are depicted as flying above the disk surfaces 44 and 94, respectively. This is the situation that occurs when the disks 44 and 94 are spinning. Under these conditions, the air bearing surface 90 flies at a height "r" of approximately 20 to 60 nm above the surface 94. The load beam 68 flies at a height "s" above the surface 94, and "s" is typically approximately 500 nm or less. Similarly, the air bearing surface 40 flies approximately 20 to 60 nm above the surface 44 and the load beam 24 flies approximately 500 nm or less above the surface 44.

Figure 2:
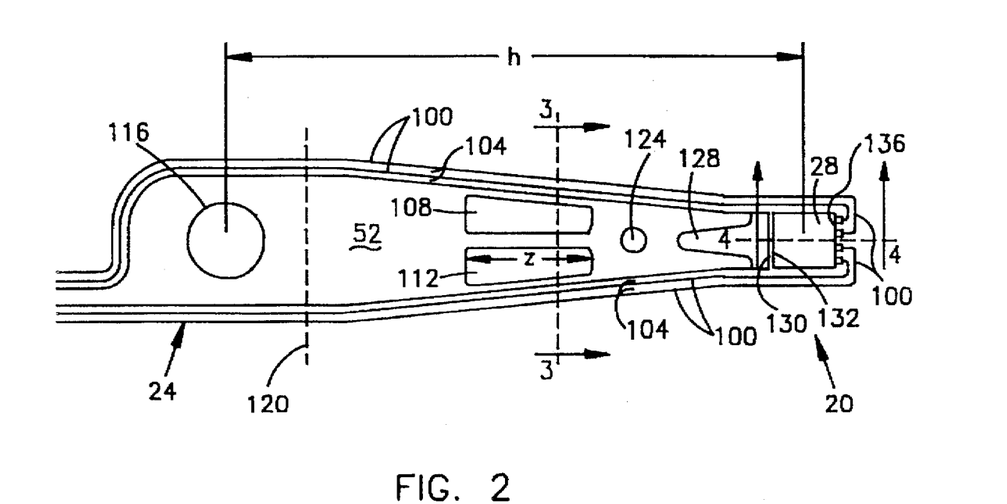
FIG. 2 is a top view of a suspension system according to the present invention.

FIG. 2 illustrates the suspension system 20 in more detail. Because the second suspension system 64 is identical to the first suspension system 20, the following description applies equally to the suspension system 44. The load beam 24 includes a plurality of electrical leads 100 formed in the second layer 52 and a plurality of spaces 104 positioned between the leads 100. A first air bearing surface structure 108 and a second air being surface structure 112 are positioned in the second layer 52. The structures 108 and 112 each have a length "z" of approximately 4 mm. An aperture 116 extends entirely through the load beam 24 and provides an attachment site for the arm 32. A reference line 120 indicates the location of the end 46 of the arm 32. A tooling hole 124 also extends completely through the load beam 24 and provides a location for the suspension with respect to the arm 32 during suspension assembly, and for the suspension with respect to the slider 28 during slider attachment. A region 128 is located at an end 130 of the arm 32 and comprises an air bearing feature that decouples the effects of the air bearing structures 108 and 112 from the effects of the air bearing surface 40 of the slider 28. The feature 128 provides a flexible connection between the air bearing surface located on the load beam 24 and the air bearing surface located on the slider 28 in such a way that the different fly heights can be achieved without excessive mechanical coupling.

The slider 28 is connected to the load beam 24 adjacent to the region 128 with an end 132 of the slider 28 positioned adjacent to the region 128. The electrical lines 100 extend along the sides of the slider 28 and connect to an end 136 of the slider 28 positioned opposite to the end 132. A distance "h" of approximately 18 mm exists between the approximate center of the aperture 116 and the approximate center of the slider 28.

Figure 3:
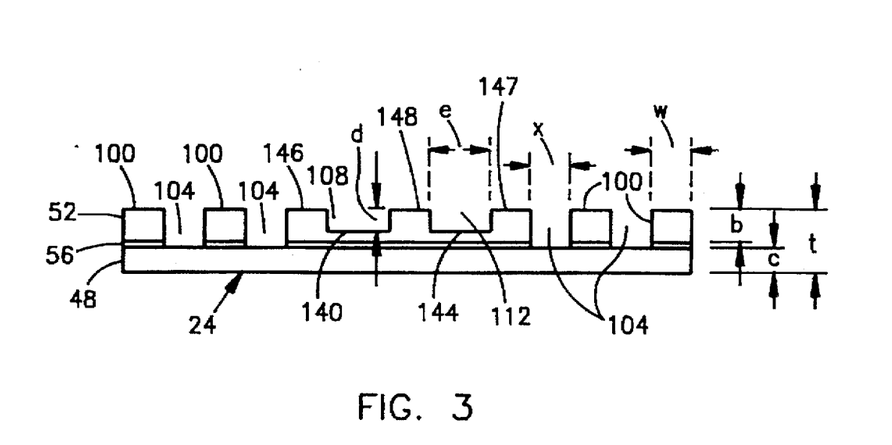
FIG. 3 is a cross-sectional view taken along the line 3—3 of FIG. 2.

FIG. 3 shows the load beam 24 in cross section and illustrates that the electrical lines 100 comprise regions of the second layer 52 that abut at least one of the spaces 104. The spaces 104 extend completely through the second layer 52 so that the first layer 48 is exposed through the space 104. The electrical lines 100 have a thickness "b" of approximately 0.018 mm which is also the thickness of the second layer 52. The first layer 48 has a thickness "c" of approximately 0.017 mm. Hence, the load beam 24 has a thickness "t" in the range of 0.035 mm to 0.040 mm. The electrical lines 100 have a width "w" of approximately 0.15 mm and the spaces 104 have a width "x" of approximately 0.10 mm.

The first air bearing surface structure 108 comprises a channel 140 formed in the second layer 52 and having a depth "d" which is in the range of 0.1 to 5.0 microns. Since the depth "d" is less than the thickness "b," a portion of the second layer 52 is positioned along the bottom of the channel 140. Similarly, the second air bearing surface structure 112 comprises a channel 144 formed in the second layer 52 and having the same depth "d" as the channel 140. The channels 140 and 144 each have widths that are tapered in the longitudinal direction. A representative width "e" measured at about the one third point along the length "z" (nearest to the end 130), is approximately 1.4 mm. A land area 146 is abuts (is positioned between) the channel 140 and one of the channels 104, and extends along the length of the channel 140 in the longitudinal direction. Similarly, a land area 147 is positioned between the channel 144 and one of the charmers 104. A land area 148 is positioned between the channels 140 and 144. The land areas 146, 147 and 148 are all formed from the second layer 52 and have the same thickness "b" as the electrical lines 100.

Typically, the channels 104 have a depth of approximately 0.018 mm. Therefore, the channels 104 are formed by well-known etching techniques such as chemical etching or plasma etching. In contrast, because of their much shallower depth, the channels 140 and 144 must be formed using a technique like ion milling or reactive ion etching (RIE). Generally, the ion milling technique is used when the channel depth is in the range of 0.1 to 5 microns and the RIE technique is used for channel depths in the range of 1–5 microns.

The electrical lines 100 have three functions. First, they function to act as the electrical connectors between the transducer on the slider 28 and the read/write electronic circuitry of the disk drive (e.g. the read/write channel 278 shown in FIG. 9). Second, the electrical connectors contribute to the formation of the air bearing between the load beam 24 and the disk 36 in the same manner that the land areas 146, 147 and 148 function. Finally, the electrical lines 100 have a mechanical function in that they provide the mechanical support for the slider 28. FIG. 2 shows that the electrical lines extend along the sides of the slider 28 and provide it with structural support.

Figure 4:
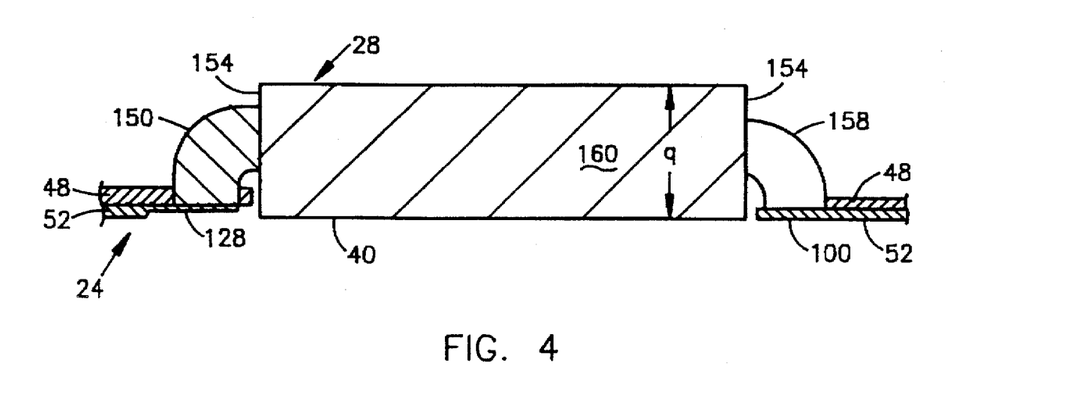
FIG. 4 is a cross-sectional view taken along the line 4—4 of FIG. 2.

FIG. 4 illustrates that the slider 28 is connected to the load beam 24 by an attachment means 150. The attachment means 150 connects a leading edge 154 of the slider 28 to the load beam 24, and usually extends through the first layer 48 to the second layer 52. Typically the attachment means 150 comprises a material such as an epoxy bond or a solder bond, but other materials could be used. The electrical lines 100 are connected to the termination pads on a trailing edge 154 of the slider 28 using a ninety degree solder reflow joint 158. The first layer 48 is partially removed to allow the solder joint 158 to make electrical contact with the electrical line 100. The attachment means 150 attaches directly to the first layer 48. When solder connections are used, some metallization can be performed on the leading edge 154 at the wafer level, thereby permitting a single solder reflow step to be used to secure the slider 28 to the load beam 24.

The etched region 128 decouples the air bearing surface 40 from the air bearing structures 108 and 112 of the load beam 24, as was described previously. Typically, the air bearing surface 40 is a negative pressure air bearing so that the slider 28 can fly well without requiring external preload. Notice that the load beam 24 delivers no preload, or a very small one, to the slider 28. FIG. 4 also illustrates that the air bearing surface (ABS) 40 of the slider 28 is flush with the lowest surface of the second layer 52.

The slider 28 includes a height "q" and an edge 160 that is perpendicular to the side of the slider 28 on which the air bearing surface 40 is positioned. The electrical lines 100 are positioned adjacent to the edge 160 so that the electrical lines 100 are positioned within the height "q" and do not extend above or below the slider 28 in the region where the electrical lines 100 are adjacent to the slider 28.

Figure 5:
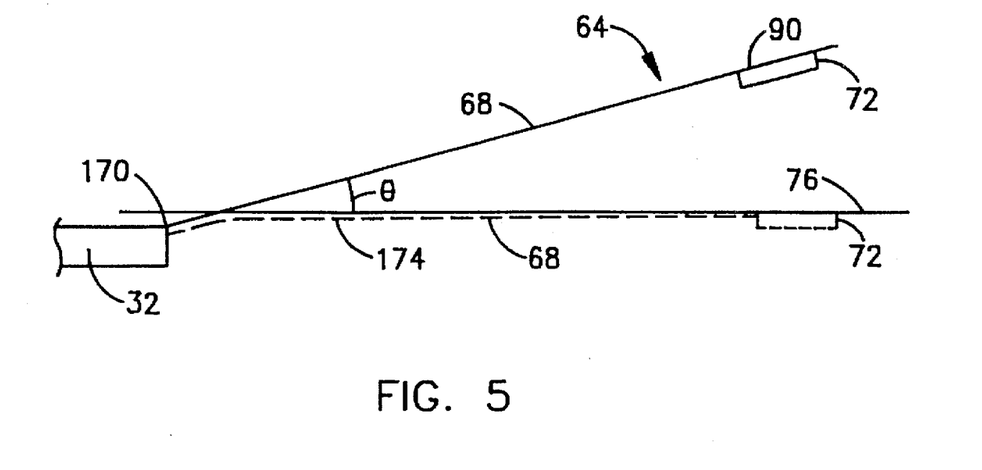
FIG. 5 is a side view of a suspension according to the present invention.

FIG. 5 illustrates the suspension 64 in the situation where a single bend at a location 170 is used to introduce a load producing force into the load beam 68. Typically, the location 170 is near the location where the load beam 68 begins to overlap the arm 32. Note that since the load beam 68 is identical to the load beam 24, the same considerations apply to the load beam 24. In the unloaded state (i.e. when the disk 76 is not holding the load beam 68 down), the single bend causes the load beam 68 to form an angle θ relative to the plane which will contain the disk 76 (the angle θ is referred to as the bend or contact angle). In the loaded state, the suspension 64 is held down by the disk 76 in the position indicated by the dashed line 174 in FIG. 5. The single bend is introduced into the load beam 68 by making a horizontal crease in the second layer 52.

Figure 6:
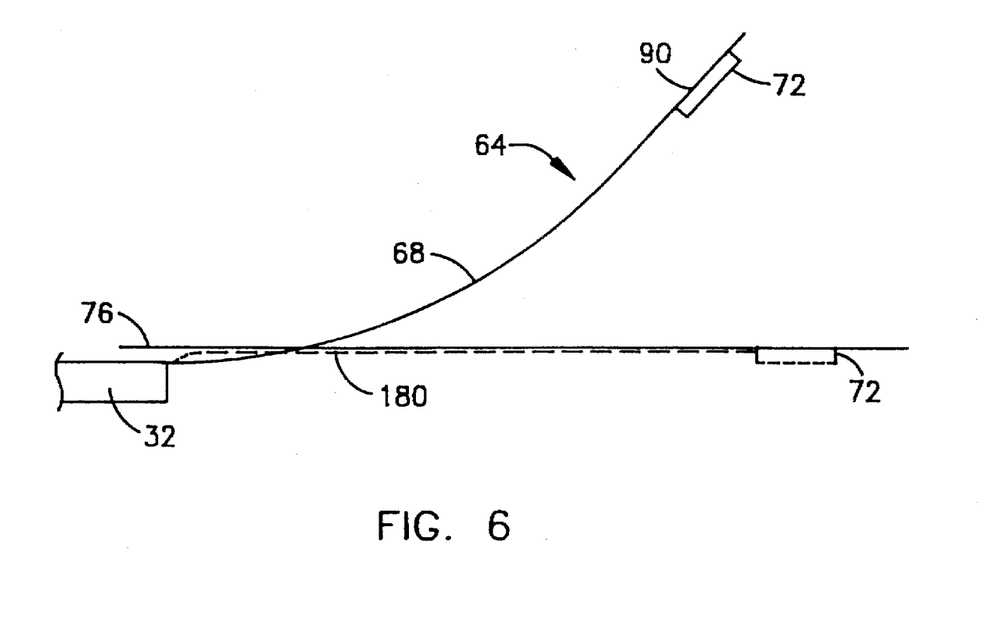
FIG. 6 is a side view of a suspension according to the present invention.

FIG. 6 illustrates the suspension 64 in the situation where a continuous bend along the load beam 68 is used to create the load force. In the loaded state, the suspension 64 is held down by the disk 76 in the position indicated by the dashed line 180 in FIG. 6. The continuous bend provides a constant pressure under the suspension due to the constant change in curvature. The estimated pressure in this case is about 0.15 mN/mm$^2$. For comparison, a standard 50% slider under 4 grams of preload produces a contact pressure of about 30 mN/mm$^2$ (14 mN/mm$^2$ if no air bearing rails exist and the whole surface is in contact). Notice that this contact pressure forces the suspension against the disk and contributes to flatten any warping or distortion of the suspension. For example, with this pressure, warping of up to 140 μm in the longitudinal direction and of up to 10 μm or more in the transversal direction could be flattened. The continuous bend is introduced into the load beam 68 by making a sufficient number of horizontal creases in the second layer 52 to approximate a continuous bend. Alternatively, the second layer 52 can be pre-rolled to create the continuous bend.

Figure 7:
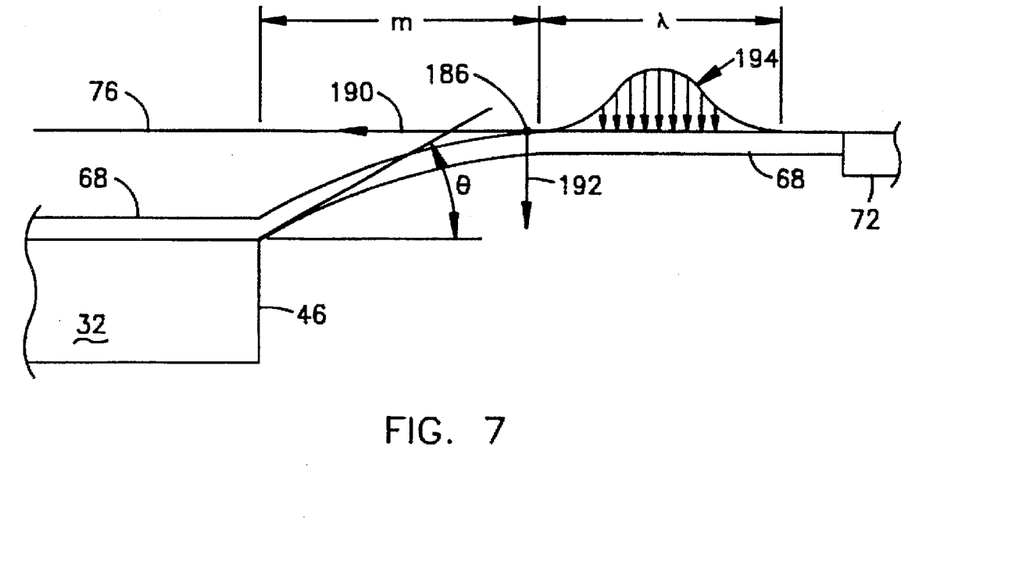
FIG. 7 is a side view illustrating the forces acting on the suspension.

FIG. 7 illustrates the forces acting on the suspension 64 (or 20). The load beam 68 includes a free length "m" and a contact length λ. A contact point 186 is the point where the load beam 68 begins to make contact with the disk 76 when moving from the arm 32 towards the slider 72. The free length "m" is the length of the load beam 68 that extends from the end 46 of the arm 32 to the contact point 186. The contact length λ is the length of the load beam 68 that is actually in contact with the disk 76. The contact length λ is about 0.8 mm along the load beam 68. This is estimated using contact theory between plates and elastic solids (half space). In FIG. 7, an arrow 190 indicates the parallel component of force that will act on the load beam 68 when disk rotation begins and an arrow 192 indicates the normal component of force that will act on the load beam 68 when disk rotation begins.

Figure 8:
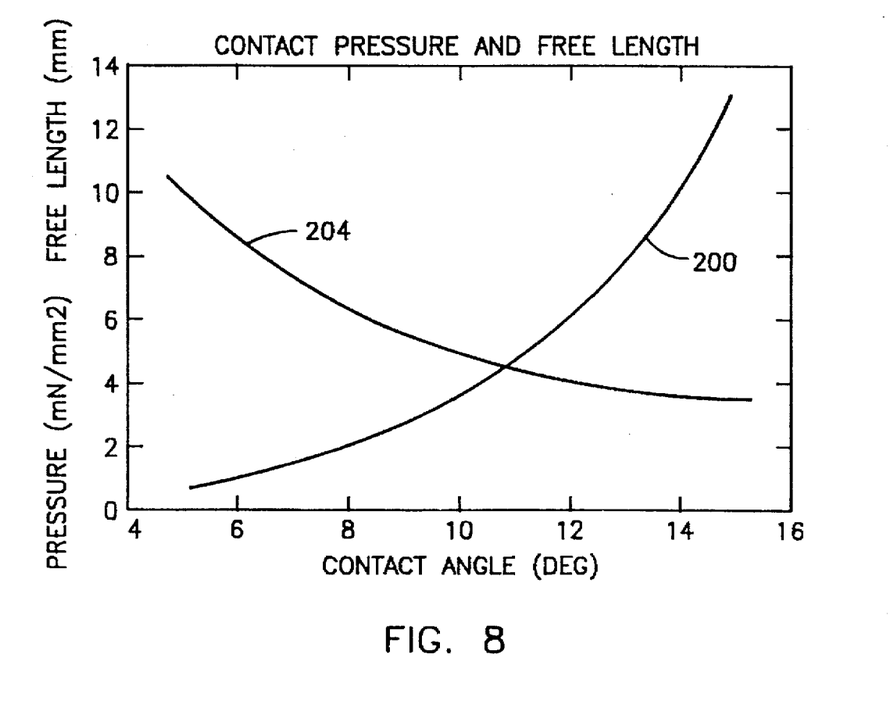
FIG. 8 is a graph showing the dependence of contact pressure and free length on bend angle.

In FIG. 7, a curve 194 illustrates the contact area which extends along the contact length λ. Inside the contact area 194, the pressure reaches a maximum near its center and decays exponentially towards its ends. The maximum contact pressure is a function of the bend angle θ (also shown in FIG. 5) and is plotted in FIG. 8 as the curve 200. The free length "m" is also plotted in FIG. 8 as the curve 204. The curves 200 and 204 in FIG. 8 illustrate that shallow bend angles produce small contact pressures but a long free length. Long free lengths deteriorate the dynamics of the load beam because in this region the load beam is not supported by the disk and the vibration frequency is low. The stiffness of the load beam in the plane of the disk also diminishes with long free lengths. A bend angle θ of approximately ten to fifteen degrees provides adequate contact pressure and free length. A separation near the slider end exists because the contact pressure is zero there. During start up, the wind pressure on the arm side of the load beam 68 (inertial force) and the air bearing force on the disk side of the load beam 68 (viscous force) combine to close any separation between the disk 76 and the load beam 68 and effectively load the load beam 68 and the slider 72 on the disk 76. This means both the suspension and the slider air bearings form correctly, and the clearance between the disk and the suspension and the slider attain the right values. When the disk 76 reaches its normal rotating velocity, the slider 72 is separated from the disk 76 by the flying height "t" shown in FIG. 1, which is normally approximately 50 nm.

Referring to FIG. 7, the design of the suspension 64 will cause the suspension 64 to be peeled off the disk when the disk 76 starts spinning if any stiction is present between the load beam 68 and the disk 76. As discussed previously, the arrows 190 and 192 indicate the parallel and normal components of force that will act on the load beam 68 when disk rotation begins. The normal component 192 will try to peel the suspension away from the disk 76. This component is proportional to the sine of the bend angle θ. The parallel component 190 is proportional to the cosine of the same angle and will try to shear the suspension from the disk. For a 12.5 degree angle, the normal force is 22% of the total pull and the parallel force is 97%. The normal force is maximum at the beginning of peeling. The slider is also peeled off from the disk by the suspension. The peeling force on the slider is about 3% of the pull. In a conventional system, there is a negative normal force that tries to plunge the slider leading edge into the disk during start up. This occurs in suspensions of the prior art because the flexure is attached to the top of the slider and produces a diving moment during start up pull. This force is about 24% of the pull plus ½ of the preload. When the diving force is canceled, stiction is greatly reduced. In the present invention, the combination of low contact pressure together with the peeling effect of the suspension ensure a low stiction force at the interface.

Figure 9:
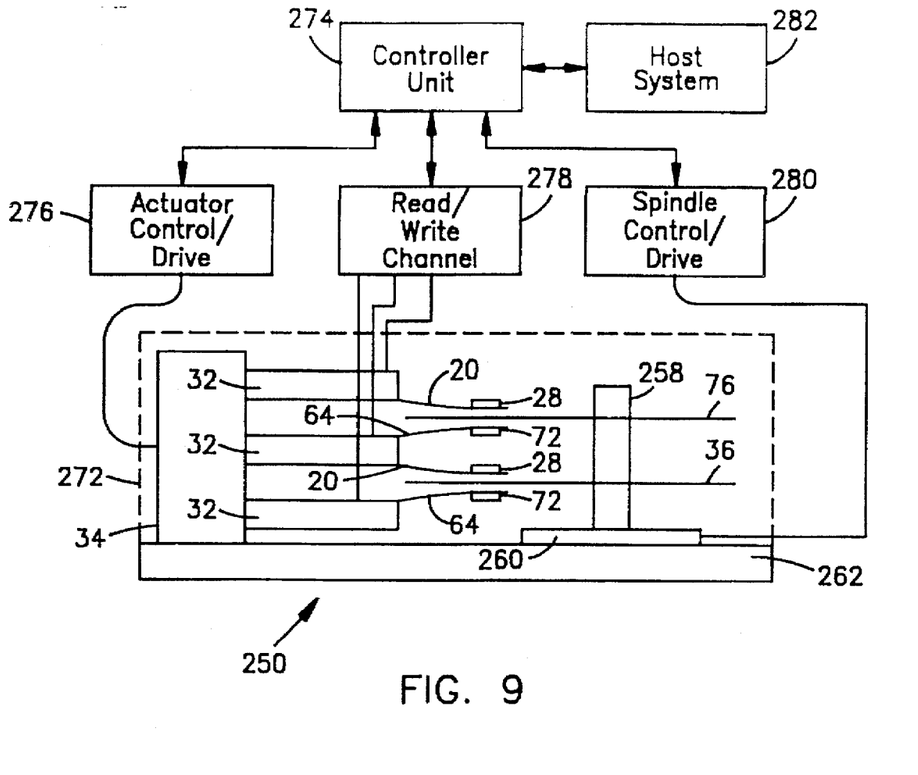
FIG. 9 is a schematic diagram of a disk file.

FIG. 9 is a schematic diagram of a magnetic recording disk file 250 that utilizes the suspensions 20 and 64 of the present invention. It should be appreciated that the suspension 20 is identical to the suspension 64 so that the following comments apply equally to either the suspension system 20 or the suspension system 64.

The disk file 250 includes a plurality of magnetic recording disks, such as the disks 36 and 76, suitable for use in hard disk drives. The disks 36 and 76 are mounted on a spindle shaft 258 which is connected to a spindle motor 260. Motor 260 is mounted to a chassis 262.

A plurality of read/write sliders, such as the sliders 28 and 72, are positioned over the disks 36 and 76 such that each disk can be accessed by the sliders 28 and 72. Each of the sliders 28 and 72 includes a transducer for reading and writing data on a plurality of concentric data tracks on the disks 36 and 76, and are attached to one of the suspension systems 20 or 64.

Each of the suspension systems 20 and 64 are attached to the actuator arm 32 which is attached to the rotary actuator 34. The rotary actuator 34 moves the actuator arm 32 (and hence the suspension systems 20 and 64) in a radial direction across the disks 36 or 76. An enclosure 272 (shown by a broken line in FIG. 9) seals the disk file 250 and provides protection from particulate contamination.

A controller unit 274 provides overall control to the magnetic recording disk file 250. The controller unit 274 contains a central processing unit (CPU), memory unit and other digital circuitry and is connected to an actuator control/drive unit 276 which in turn is electrically connected to the actuator 270. This allows the controller unit 274 to control the movement of the sliders 28 and 72 over the disks 36 and 76. The controller unit 274 is electrically connected to a read/write channel 278 which in turn is electrically connected to the sliders 28 and 72. This allows the controller unit 274 to send and to receive data from the disks 36 and 76.

The controller unit 274 is electrically connected to a spindle control/drive unit 280 which in turn is electrically connected to the spindle motor 260. This allows the controller unit 274 to control the rotation of the disks 36 and 76. A host system 282, which is typically a computer system, is electrically connected to the controller unit 274. The host system 282 may send digital data to the controller unit 274 to be stored on the disks 36 and 76, or may request that digital data be read from the disks 36 and 76 and sent to the host system 282. The basic operation and structure of data storage systems, such as the disk file 250 (without the suspension systems 20 or 64), is well-known in the art.

Figure 10:
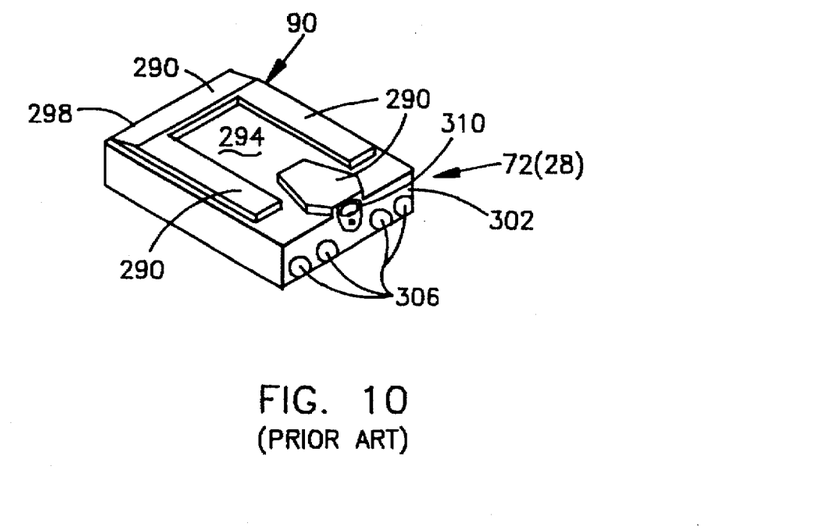
FIG. 10 is an isometric view of a slider.

FIG. 10 illustrates the air bearing surface (ABS) 90 of the slider 72. The slider 72 is a conventional magnetoresistive (MR) slider. The ABS 90 comprises a plurality of rails 290 that create high pressure regions and a central region 294 that creates a low pressure region. The aerodynamic forces of the rails 290 and the region 294 combine to create an air bearing that enables the slider 72 to fly over the disk 76 when the disk 76 is rotating, as is well-known. The slider 72 includes leading edge 298 and a trailing edge 302. A plurality of attachment sites 306, such as solder balls, are positioned on a trailing edge 302 for allowing electrical connection to the electrical leads 100 to be made. A transducer 310 is formed on the trailing edge 302 for reading and/or writing data on the disk 76. It should be noted that the air bearing surface 40 of the slider 28 is identical to the ABS 90 and functions in the same manner as described above for the ABS 90.

Referring to FIGS. 1-3, the suspension 20 (and the suspension 64) functions as follows. When the disk 36 begins to spin, the channels 140 and 144 create regions of negative pressure that cause the load beam 24 to be pulled toward the disk 36. At the same time, the land areas 146, 147 and 148 create regions of positive pressure that cause the load beam 24 to be pushed away from the disk 36. The combination of these forces creates a stiff air bearing between the disk 36 and the load beam 24 that, when combined with the structural stiffness of the load beam 24, yields bending and torsional frequencies on the order of approximately 10 kHz (second mode is almost 30 kHz) instead of a few hundred kHz if no air bearing was present. The next vibrational mode is yawing in the suspension plane, which, due to the relatively large width of the load beam structure 24, is also in the range of approximately 10 kHz.

As discussed previously, the whole length of the load beam 68 (or 24) and/or the slider 72, may not be in contact with the disk 76 before the disk begins spinning. However, the contact region λ (shown in FIG. 7) is in contact with the disk 76 before the disk begins spinning. When the disk 76 begins to spin, an air bearing forms in the contact region λ and the separation between the disk 76 and other parts of the suspension 64 is closed because a vacuum is created between the load beam 68 and the disk 76. The air flow on the side of the load beam 68 not facing the disk 76 presses the load beam 68 toward the disk 76. After the separations are closed, the channels 140 and 144, the land areas 146, 147 and 148, and the ABS 90, allow a full air bearing to develop underneath the load beam 68 and the slider 72.

Wear of the copper or polyimide layer is very low due basically to the low contact pressure and the absence of stiff corners contacting the disk 36. Typical wear curves of materials show a low wear rate at low contact pressure and a higher rate at high pressure. Wear is usually expressed as $$D=kLx/h$$

where D is the wear, k is the wear coefficient, L is the pressure, x is the sliding distance and h is the hardness. A wear comparison can be established with a "contact recording" head wear rate because of the availability of data (the term "contact recording" head refers to a slider with no air bearing that physically contacts the disk). In the "contact recording" head, the contact pressure is 480 mN/mm$^2$ (pad size is 0.035×0.035 mm) under a preload of 0.59 mN and the wear is 1.3 μm after 160 hours of operation. When the pressure is reduced to 318 mN/mm$^2$ the wear is 0.85 μm. The disk employed had a peak to peak mean surface height of 12 nm. If the disk roughness is reduced to one half, the wear in the pad reduces to almost 10%. It was also noticed that smaller pressures would produce almost no measurable wear because the head lifts due to hydrodynamic forces. Another fact to consider is that the total time of contact during start and stop after, say 100,000 cycles, is probably no more than 30 hours, assuming that contact lasts only 0.5 sec during start and 0.5 sec during stop. The actual number is related to air bearing take off and landing speed. In any case, the contact pressure diminishes from the moment the disk starts to rotate because a partial air bearing forms immediately and becomes zero when the suspension has lifted. Hardness is proportional to the modulus of elasticity of metals. In nonmetallic materials like rubber and polyimide the wear law is different but it is still dependent on the pressure and sliding distance. The elastic modulus of copper is about 1.4×10$^8$ mN/mm$^2$. The elastic modulus of alumina, used for the contact recording head, is 3.7 mN/mm$^2$.

Another important point to consider is that there are no stiff corners in the suspension 20 of the present invention. In the contact recording head, as well as in conventional sliders, the pads or rails have stiff corners with very small radii of curvature, that make actual contact with the disk because the disk is not flat. Thus, most of the wear in the disk, and little in the rails, occurs due to the corners in contact. Since the suspension 20 is flexible, any possible contact point gets deformed and a contact area takes place instead. If a "linear" extrapolation is applied to the present invention, the wear rates are between 0.1 and 5 nm. This means that the wear particles are much smaller than 5 nm, and considering that the flying height is about 500 nm for the load beam 24 and 50 nm for the slider 28, there seems to be no problem.

Similarly, the air bearing of the slider 72 is designed to fly at about 50 nm and the load beam 68 flies at about 500 nm. Notice that the slider flying height is very insensitive to the distribution of the suspension preload pressure. This means that it is also very insensitive to the geometry of the suspension. Viscous drag and power dissipated under the suspension are estimated to be very small because the flying height in the suspension is high (i.e. higher than 500 nm). This puts the air bearings 108 and 112 (shown in FIG. 2) in the continuous Stokes range, with little rarefaction effects, but still with a very small Reynolds number, which means that the flow is quasistatic or viscosity dominated. In this case, the power generated by the Couette and Poiscuille flows under a 3.5 inch disk spinning at 7200 rpm is about 9×10$^{-5}$ W, and the drag force is 0.09 mN. As a comparison, the power generated by an actuator coil is in the range of 5 W. The sensitivity of the flying height of the air bearing surface (ABS) of the suspension 20 to track accessing velocity could be the same or more than the slider's.

In the first case no interaction between the air bearing features 108 and 112 and the air bearing surfaces 40 of the slider 28 is expected. In the second, the difference in flying heights will create a moment and a force on the slider 28. Assuming, for simplicity, that the slider flying height is constant and that the suspension changes +/−30% or 150 nm, the resultant force and moment would be 0.6 mN and 0.9 mN-mm. Since a standard slider under 4 gm preload and 150 mN-mm/Rad pitch and roll stiffness experiences variations in load and moment of about 4 mN and 4 mN-mm, it can be seen that even under extreme variations in suspension flying height, the slider 28 will be better off than a slider in a conventional suspension. Another way of looking at the problem is to consider that the air bearing stiffness is proportional to the inverse of the third power of the spacing. Since the ratio of spacings of the suspension and slider is 10, then the slider 28 will be about 1000 times stiffer than the load beam 24.

With respect to the height of the suspension 20, it can be seen that the profile height of the suspension 20 is the thickness of the slider 28. For instance, if a 50% slider size is used, the disk spacing that could be realized is about 1.2 mm. A 30% Pico slider would allow 0.9 mm or even 0.8 disk spacing, assuming 0.15 or 0.1 mm for merge for each HSA. (A 50% slider is a slider having dimensions of approximately 2.0×1.6×0.425 mm. A 30% Pico slider is a slider having dimensions of approximately 1.25×1.0×0.3 mm.

Distortion of the suspension 20 due to thermal and humidity variations affect operation negligibly. The coefficient of thermal expansion (CTE) of copper is about $20\times10^{-6}/C$ and of polyimide varies between 18 and $30\times10^{-6}/C$. The hygroscopic coefficient CHE is up to $22\times10^{-6}/\%$ RH for some types of polyimides, although some are very insensitive to humidity changes. The change in curvature could be easily defeated by the contact pressure between the suspension 20 and the disk 36, as was explained above. Flying height of the suspension 20 is slightly affected because the air bearing is very stiff (equivalent to a change in flying height due to a change in contact pressure). By removing narrow bands of polyimide in the transversal direction the curling effect is reduced substantially.

During severe shock loads perpendicular to the plane of the disk 36, the slider 28 moves away from the disk 36 first and then the load bean 24 follows, in a manner that resembles peeling the load beam 24 from the disk 36. Then, the load beam 24 returns to the disk 36 first, followed by the slider 28, in the opposite action of peeling, like rolling a carpet. This smoothes the contact interaction, and the air film that forms between the load beam 24 and the disk 36 is reduced even more than the contact pressure between the slider and the disk. Notice also that due to the low bending frequency of the load beam 24, a 2 ms or 3 ms shock pulse may not be able to excite the suspension 20 in a way to cause sufficient slider acceleration to cause damage to the disk 36.

Another advantage of the present invention is related to coupling between disk tilting during vibration and slider off track motion. In a conventional suspension, when the disk tilts, the slider follows the disk and tilts also, as a first approximation, about the dimple. Thus, the tilting angle times the distance from the ABS to the dimple would be the off track excursion. In conventional disk files, this distance is about 0.6 mm and the off track excursion due to the coupling effect is about 6 µin, which is about ⅓ of the total TMR budget (TMR means track misregistration error). In higher density files this effect could be worse. In the present invention, the corresponding distance is about 0.009 mm (half the thickness) and the off track excursion is then the ratio of the distances (0.6 and 0.009 mm), which is only about 1.5%.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A suspension for use in a disk drive comprising:
    an elongated section having a first end, a second end, a length "k" measured between the first end and the second end, and a thickness "t," a region of the elongated section in the vicinity of the first end being adapted for attachment to an actuator arm, the elongated section comprising a first layer comprised of a dielectric material and a second layer comprised of an electrically conductive material;
    a first air bearing means positioned in the elongated section for creating an air bearing between the elongated section and a data storage medium sufficient to cause the elongated section to fly above the surface of the data storage medium at a height "s" when the data storage medium is rotating, the first air bearing means comprising at least a first shallow channel formed in the second layer and a first raised area formed in the second layer, with no part of the first shallow channel extending completely to the second end, so that a section of the second layer is positioned between the first shallow channel and the second end in the direction of the length "k"; and
    a slider for supporting a data transducer, the slider comprising a second air bearing means for causing the slider to fly above the surface of the data storage medium when the data storage medium is rotating, the slider being attached to the elongated section in the vicinity of the second end.

2. The suspension of claim 1 wherein the first air bearing means further comprises a second shallow channel formed in the second layer, a second raised area formed in the second layer and a third raised area formed in the second layer, the first raised area abutting the first shallow channel but not abutting the second shallow channel, the second raised area abutting both the first shallow channel and the second shallow channel, and the third raised area abutting the second shallow channel but not abutting the first shallow channel.

3. The suspension of claim 1 wherein the second layer is selected from the group consisting of a Cu—Ni—Si—Mg alloy, a Cu—Be—Ni alloy, a Cu—Fe—P—Zn alloy and a Cu—Ti alloy.

4. The suspension of claim 1 wherein the thickness "t" is approximately 0.04 mm.

5. The suspension of claim 1 wherein the shallow channel has a depth in the range of approximately 0.1 to 5.0 microns.

6. The suspension of claim 1 further comprising a decoupling means positioned between the first air bearing means and the second air bearing means for decoupling the aerodynamic effect of the first air bearing means from the aerodynamic effect of the second air bearing means.

7. The suspension of claim 1 wherein the height "s" is approximately 500 nm.

8. The suspension of claim 1 further comprising at least one electrical line for establishing an electrical connection to a transducer positioned on the slider, the electrical line comprising a portion of the second layer that extends along the elongated section in the general direction of the length "k" and along an edge of the slider that is perpendicular to a surface of the slider on which the second air bearing means is positioned.

9. The suspension of claim 8 wherein the electrical line forms part of the first air bearing means.

10. A suspension for use in a magnetic disk drive comprising:
    an elongated section having a first end, a second end, a length "k" measured between the first end and the second end, and a thickness "t," a region of the elongated section in the vicinity of the first end being adapted for attachment to an actuator arm, the elongated section comprising a first layer comprised of a dielectric material and a second layer comprised of an electrically conductive material having a thickness "b";

a first air-bearing feature positioned in the elongated section and comprising a first channel formed in the second layer, the first channel having a depth "d" which is less than the thickness "b", the first channel being abutted along at least one longitudinal side by a portion of the second layer having the thickness "b", with no part of the first channel extending completely to the second end, so that a section of the second layer is positioned between the first channel and the second end in the direction of the length "k";

a second air-bearing feature positioned in the elongated section and comprising a second channel formed in the second layer, the second channel having a depth "d" which is less than the thickness "b," the second channel being abutted along at least one longitudinal side by a portion of the second layer having the thickness "b," with no part of the second channel extending completely to the second end, so that a section of the second layer is positioned between the second channel and the second end in the direction of the length "k", the first air bearing feature and the second air bearing feature causing the elongated section to fly above the surface of a magnetic medium at a height "s" when the magnetic medium is rotating; and a slider for supporting a magnetic read/write transducer, the slider comprising an air bearing means for causing the slider to fly above the surface of the magnetic medium at a height "r" when the magnetic medium is rotating, the slider being attached to the elongated section in the vicinity of the second end.

11. The suspension of claim 10 wherein the second layer is selected from the group consisting of a Cu—Ni—Si—Mg alloy, a Cu—Be—Ni alloy, a Cu—Fe—P—Zn alloy and a Cu—Ti alloy.

12. The suspension of claim 10 wherein the thickness "b" is approximately 0.04 mm.

13. The suspension of claim 10 wherein the depth "d" is in the range of approximately 0.1 to 5.0 microns.

14. The suspension of claim 10 further comprising a decoupling means positioned between the first air bearing feature and the slider for decoupling the aerodynamic effect of the first air bearing feature from the aerodynamic effect of the air bearing surface on the slider.

15. The suspension of claim 10 further comprising a plurality of electrical lines formed in the second layer for making electrical connection between a magnetic read/write transducer positioned on the slider and the read/write components of a disk drive.

16. A magnetic disk file comprising:

a rotatable magnetic medium;

an actuator;

an actuator arm connected to the actuator, the actuator functioning to move the actuator arm relative to the rotatable medium;

a suspension connected to the actuator arm and comprised of:

an elongated section having a first end, a second end, a length "k" measured between the first end and the second end, and a thickness "t," a region of the elongated section in the vicinity of the first end being attached to the actuator arm, the elongated section comprising a first layer comprised of a dielectric material and a second layer comprised of an electrically conductive material;

a first air-bearing means positioned in the elongated section for creating an air bearing between the elongated section and the magnetic medium sufficient to cause the elongated section to fly above the surface of the magnetic medium when the magnetic medium is rotating, the first air bearing means comprising at least a first shallow channel formed in the second layer and a first raised area formed in the second layer, with no part of the first shallow channel extending completely to the second end, so that a section of the second layer is positioned between the first shallow channel and the second end in the direction of the length "k"; and a slider for supporting a magnetic read/write transducer, the slider comprising a second air bearing means for causing the slider to fly above the surface of the magnetic medium when the magnetic medium is rotating, the slider being attached to the elongated section in the vicinity of the second end.

17. The disk file of claim 16 wherein the first air bearing means further comprises a second shallow channel formed in the second layer, a second raised area formed in the second layer and a third raised area formed in the second layer, the first raised area abutting the first shallow channel but not abutting the second shallow channel, the second raised area abutting both the first shallow channel and the second shallow channel, and the third raised area abutting the second shallow channel but not abutting the first shallow channel.

18. The disk file of claim 16 wherein the second layer is selected from the group consisting of a Cu—Ni—Si—Mg alloy, a Cu—Be—Ni alloy, a Cu—Fe—P—Zn alloy and a Cu—Ti alloy.

19. The disk file of claim 16 wherein the thickness "t" is approximately 0.04 mm.

20. The disk file of claim 16 wherein the first shallow channel has a depth in the range of approximately 0.1 to 5.0 microns.

21. The disk file of claim 16 further comprising a decoupling means positioned between the first air bearing means and the second air bearing means for decoupling the aerodynamic effect of the first air bearing means from the aerodynamic effect of the second air bearing means.

22. The disk file of claim 16 further comprising a plurality of electrical lines formed in the second layer for making electrical connection between a magnetic read/write slider and the read/write components of a disk drive.

23. The disk file of claim 16 wherein the elongated section includes at least one bend that causes a region of the elongated section to make contact with the magnetic medium when the magnetic medium is not rotating.

24. The disk file of claim 16 wherein the second air bearing surface includes a first surface that is located adjacent to the rotatable magnetic medium and the second layer includes a second surface that is located adjacent to the rotatable magnetic medium, and wherein the first surface is coplanar with the second surface.

* * * * *